(12) United States Patent
Inomata

(10) Patent No.: US 7,059,522 B2
(45) Date of Patent: Jun. 13, 2006

(54) OBJECT DETECTING APPARATUS HAVING HYDROPHILIC LIGHT RADIATING WINDOW

(75) Inventor: Makoto Inomata, Handa (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/043,003

(22) Filed: Jan. 25, 2005

(65) Prior Publication Data

US 2006/0054701 A1    Mar. 16, 2006

(30) Foreign Application Priority Data

Feb. 19, 2004   (JP) .............................. 2004-043180

(51) Int. Cl.
*G06K 7/10*   (2006.01)
*G06K 7/14*   (2006.01)

(52) U.S. Cl. ..................................... 235/454

(58) Field of Classification Search ........... 235/462.01, 235/462.47, 455, 470, 494, 472.01, 454, 235/472.02, 472.03; 250/492.1, 221

See application file for complete search history.

(56) References Cited

U.S. PATENT DOCUMENTS

| 3,832,561 | A | * | 8/1974 | O'Keeffe | .............. | 250/492.1 |
|---|---|---|---|---|---|---|
| 5,689,328 | A | | 11/1997 | Katayama | .................. | 356/4.01 |
| 2003/0017303 | A1 | * | 1/2003 | Shindo et al. | ............... | 428/141 |
| 2004/0065738 | A1 | * | 4/2004 | Silverbrook et al. | ......... | 235/454 |
| 2004/0115826 | A1 | * | 6/2004 | Budach et al. | ............... | 436/172 |
| 2004/0145457 | A1 | * | 7/2004 | Schofield et al. | ......... | 340/425.5 |

FOREIGN PATENT DOCUMENTS

| JP | 7-225271 | | 8/1995 |
|---|---|---|---|
| JP | 2002-31685 | | 1/2002 |
| JP | 2002031685 A | * | 1/2002 |

* cited by examiner

*Primary Examiner*—Thien M. Le
*Assistant Examiner*—Thien Mai
(74) *Attorney, Agent, or Firm*—Harness, Dickey & Pierce, PLC

(57) ABSTRACT

An object detecting apparatus comprises a case, a light radiation unit and a light receiver unit. The case has a light radiating window and a light receiving window. The light radiating window has a hydrophilic layer on the outermost surface of the light radiating window. The hydrophilic layer restricts water droplets remaining on the light radiating window from functioning as light collecting lenses, so that the light is radiated outward without being scattered by the water droplets. Specifically, the light radiating window further has a glass substrate at an innermost side and a photo-catalyst layer between the glass substrate and the hydrophilic layer. The hydrophilic layer is made of silicon dioxides.

20 Claims, 3 Drawing Sheets

DRY CONDITION AND WET CONDITION

OBJECT DETECTING APPARATUS HAVING HYDROPHILIC LIGHT RADIATING WINDOW

CROSS REFERENCE TO RELATED APPLICATION

This application is based on and incorporates herein by reference Japanese Patent Application No. 2004-43180 filed on Feb. 19, 2004.

FIELD OF THE INVENTION

The present invention relates to an object detecting apparatus mounted on a vehicle, for instance, for detecting an object such as a preceding vehicle or a distance to such an object by using a laser light.

BACKGROUND OF THE INVENTION

A conventional object detecting apparatus mounted on a vehicle uses a laser light, for instance, to detect an object such as a preceding vehicle or a distance to such an object. This detecting apparatus intermittently drives a laser diode to radiate the laser light towards the forward area of the vehicle, and detects the light reflected from the forward obstacle by a photo sensor. The detecting apparatus measures the distance to the forward obstacle based on a time difference between a light radiation time and a light receiving time.

Specifically, as disclosed in JP 2002-031685A, the detecting apparatus comprises a light radiation unit for radiating a laser light, a polygon mirror and a light receiver unit for receiving a reflected light. The polygon mirror is shaped in a frustum of a hexagonal pyramid and rotatable as a scanning mirror. According to this construction, the polygon mirror reflects the laser light radiated from the light radiation unit and directs it to the forward area of the vehicle.

As the polygon mirror is rotated and the laser light from the light radiation unit is directed to each side surface of the polygon mirror, so that the angle of reflection of the laser light at the polygon mirror is adjusted to scan a predetermined range of the forward area of the vehicle by the laser light. The receiver unit includes a Fresnel lens and a light receiving element to receive the laser light reflected from the forward object and measure the distance thereto.

Various component parts of the apparatus including the above parts are accommodated within a closed case so that a scanning mechanism, optical devices and electronic circuits are protected from frosting of water or foreign matters such as dust.

For passing the laser light through the case, the case is formed to have a light radiating window for radiating the laser light outward to the object and a light receiving window for receiving the laser light reflected by the object. Those windows are made of light-transmitting material, and fit in respective openings provided in the case.

The light radiating window is made of material having high repellency such as a glass. Therefore, as shown in FIGS. 5A and 5B, water droplets become spherical on the surface of the window. The water droplets operate as lenses and the laser light reflected by the polygon mirror is undesirably scattered when radiated to the case outside.

As shown in FIG. 6, the object detecting range of the apparatus is widened under the wet condition, in which the water droplets remain on the outside surface of the light radiating window, than under the dry condition. As a result, the apparatus is likely to erroneously detect an object existing forward of a vehicle as a wider object than it is.

SUMMARY OF THE INVENTION

It is therefore an object of the present invention to provide an object detecting apparatus, which accurately detects an object or a distance to an object even if water adheres to a light radiating window surface.

According to the present invention, an object detecting apparatus comprises a case, a light radiation unit and a light receiver unit. The case has a light radiating window and a light receiving window. The light radiating window has a hydrophilic layer on the outermost surface of the light radiating window. The hydrophilic layer restricts water droplets remaining on the light radiating window from functioning as light collecting lenses, so that the light is radiated outward without being scattered by the water droplets.

Preferably, the light radiating window further has a glass substrate at an innermost side and a photo-catalyst layer between the glass substrate and the hydrophilic layer. The hydrophilic layer is made of silicon dioxides.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
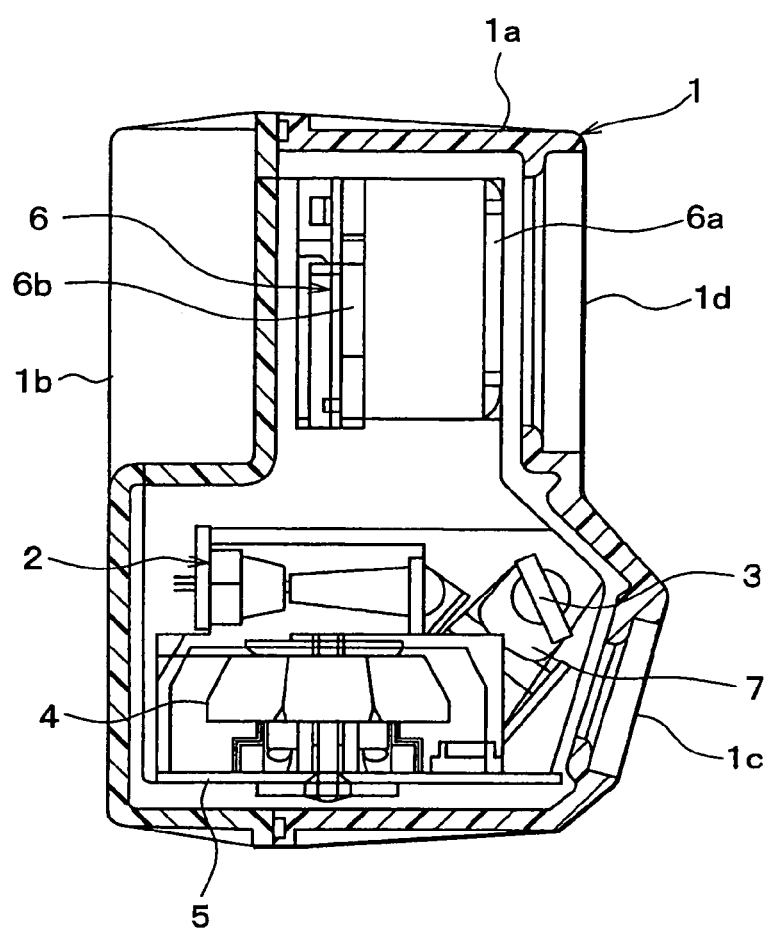
FIG. 1 is a perspective view of an object detecting apparatus according to an embodiment of the present invention.

Referring first to FIG. 1, an object detecting apparatus includes a case 1 shaped in a cuboid and various component parts accommodated in the case 1. The apparatus is mounted on a vehicle to be used as a laser radar. The apparatus is positioned to radiate a laser light in the forward direction of the vehicle (rightward direction in FIG. 1) to detect a distance to a forward object such as a preceding vehicle during an auto-cruise control condition.

The case 1 includes a first case 1a and a second case 1b. The first case 1a is box-shaped and open at its one side (left side in FIG. 1). The first case 1a accommodates therein various component parts. The first case 1a has a resin wall part made of PPS resin and form a housing. The first case 1a has a light radiating window 1c and a light receiving window 1c arranged at the lower and the upper sections on the front-side resin part. The windows 1c and 1d include light-transmitting plate such as glass and acrylic resin.

Figure 2:
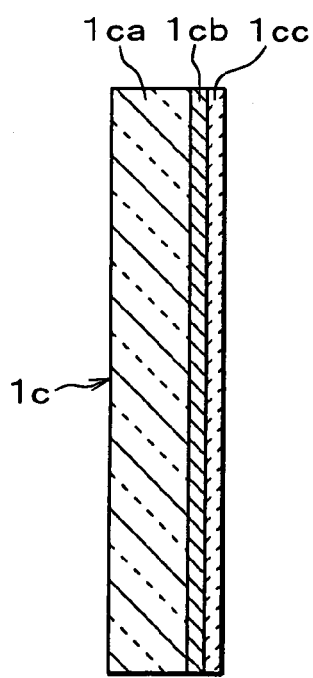
FIG. 2 is a sectional view of a light radiating window of the apparatus shown in FIG. 1.

As shown in FIG. 2, the light radiating window 1c (also light receiving window 1d) is made of a glass substrate 1ca, a photo-catalyst layer 1cb formed on the surface of the glass substrate 1ca, and a hydrophilic layer 1cc having high wettability and formed on the surface of the catalyst layer 1cb. The photo-catalyst layer 1cb may be made of titan dioxides (TiO2) and the hydrophilic layer 1cc may be made of silicon dioxides (SiO2).

The light radiating window 1c is attached to the case 1a such that the hydrophilic layer 1cc is exposed to the outside. Thus, the surface of the photo-catalyst layer 1cb that is exposed to the outside environment is covered with the hydropholic layer 1cc, while attaining photo-catalyst function of the photo-catalyst layer 1cb.

Figure 3A:
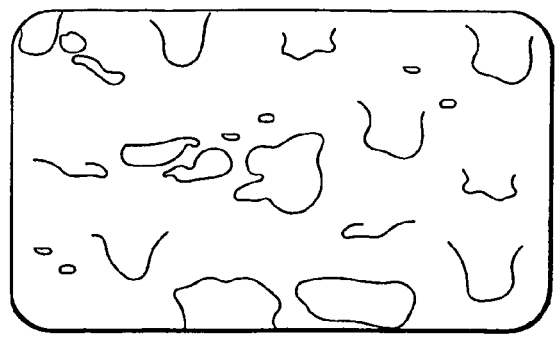
FIGS. 3A and 3B are a plan view and a side view of the light radiating window when water adheres to a window surface.
Figure 3B:
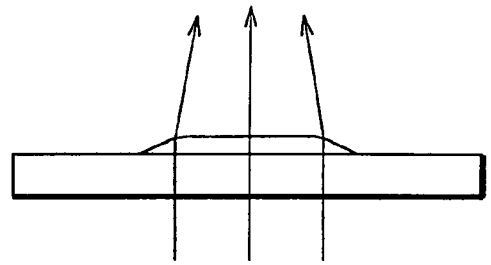

As shown in FIGS. 3A and 3B, when water droplets adhere to the outer surface of the hydrophilic layer 1cc due to rainfall or the like, the water droplets easily expand on the outer surface of the hydrophilic layer 1cc due to high wettability of the layer 1cc. As a result, the laser light is less likely to scatter and does not provide the light collecting function.

The second case 1b is made of resin and attached to close the opening of the first case 1a. In the case 1, an electrical connector (not shown) is provided such that it partly extends from the case 1. The connector connects the electrical parts (not shown) provided inside and outside the case 1.

The case 1 accommodates a light radiation unit 2, a reflection mirror 3, a polygon mirror 4 and an electric circuit board 5 in the lower part. The circuit board 5 includes an electronic control circuit, which are connected to the light radiation unit 2, a light receiving unit 6 and the like to measure the distance to the forward object. The light receiving unit 6 is positioned inside the case 1 in the upper part to face the light receiving window 1d and includes a Fresnel lens 6a and a light receiving element 6b.

The light radiation unit 2 is driven by the control circuit provided on the circuit board 5 and radiates the laser light towards the reflection mirror 3. The light radiation unit 2 may include a laser diode to radiate the laser light in the pulse form.

The reflection mirror 3 reflects the laser light radiated from the radiation unit 3 and directs it to the polygon mirror 4. The reflection mirror 3 is supported swingably to the inner case 1c by a support part 7 fixed to the inside wall of the case 1. For instance, the reflection mirror 3 may be driven by a motor (not shown) and controlled by the electric circuit of the circuit board 5 to adjust the direction of reflection.

The polygon mirror 4 is shaped in a frustum hexagonal prism and supported by the case 1. The mirror 4 is rotatable about an axis of the hexagonal prism. This mirror 4 is also driven by a motor (not shown) controlled by the control circuit of the circuit board 5. The polygon mirror 4 has around its periphery mirror faces, each of which operates as a scanning reflection mirror.

Specifically, the polygon mirror 4 reflects the laser light radiated from the radiation unit 2 and reflected by the reflection mirror 3, and directs the laser light toward the vehicle forward area through the radiating window 1c. As the polygon mirror 4 is rotated, the angle of the side face of the polygon mirror 4 changes. As a result, the angle of projection of the laser light is changed to scan a predetermined forward area of the vehicle.

The Fresnel lens 4 is positioned below the light receiving element 6b. The Fresnel lens 6a collects the laser light reflected from the forward object and received through the window 1d. The light receiving element 6b receives the collected light and produces an output voltage or output current varying with the intensity of the received light. The output voltage or current is applied to the control circuit of the circuit board 5.

The object detecting apparatus constructed as above operates in the following manner, assuming that it is mounted in a vehicle and an auto-cruise control system switch is turned on. The following operation is mostly controlled by the control circuit of the circuit board 5.

The reflection mirror 3 is first driven to a predetermined angular position by the motor. The light radiation unit 2 radiates the laser light at predetermined intervals. The laser light is reflected by the reflection mirror 3 and the polygon mirror 4 to be directed toward the forward area of the vehicle through the radiating window 1c as shown with an arrow in FIG. 2. When the laser light is reflected by an object such as a preceding vehicle, the reflected light passes the light enters the light receiver unit 6 through the light receiving window 1d.

In the light receiver unit 6, the reflected light is collected by the Fresnel lens 6a and received by the light receiving element 6b. The light receiving element generates an output signal in response to the reception of the collected light. Based on this output signal, the control circuit calculates a distance L to the forward object by using the laser light travel speed V and the time difference T between the laser light radiation by the radiation unit 2 and the reception of the laser light by the light receiver unit 6: $L = V \times T/2$.

The calculated distance is output through the connector 1h to various devices such as an engine control ECU and a brake control ECU provided outside the case 1. As a result, the ECUs may control an engine and/or brakes to maintain the distance to the object at a predetermined distance.

According to the above embodiment, the hydrophilic layer 1cc is provided on the outermost surface of the light radiating window 1d. Even when water droplets such as raindrops stick to the light radiating window 1d, the water droplets rarely work as light collecting lenses. Thus, even when the laser light passes the water droplets, it is not scattered so much.

Figure 4:
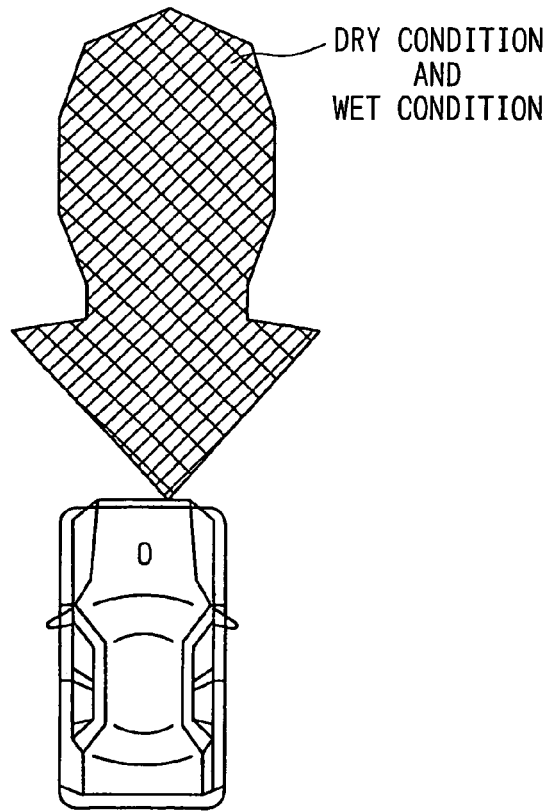
FIG. 4 is a schematic view of an object detecting range provided by the apparatus shown in FIG. 1.
Figure 5A:
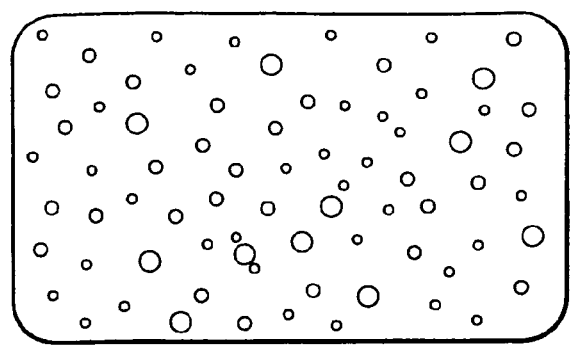
FIGS. 5A and 5B are a plan view and a side view of the light radiating window when water adheres to a window surface of a conventional apparatus.
Figure 5B:
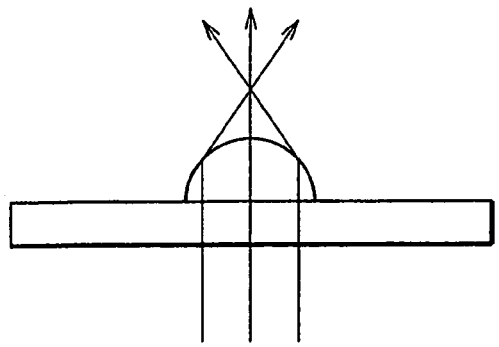
Figure 6:
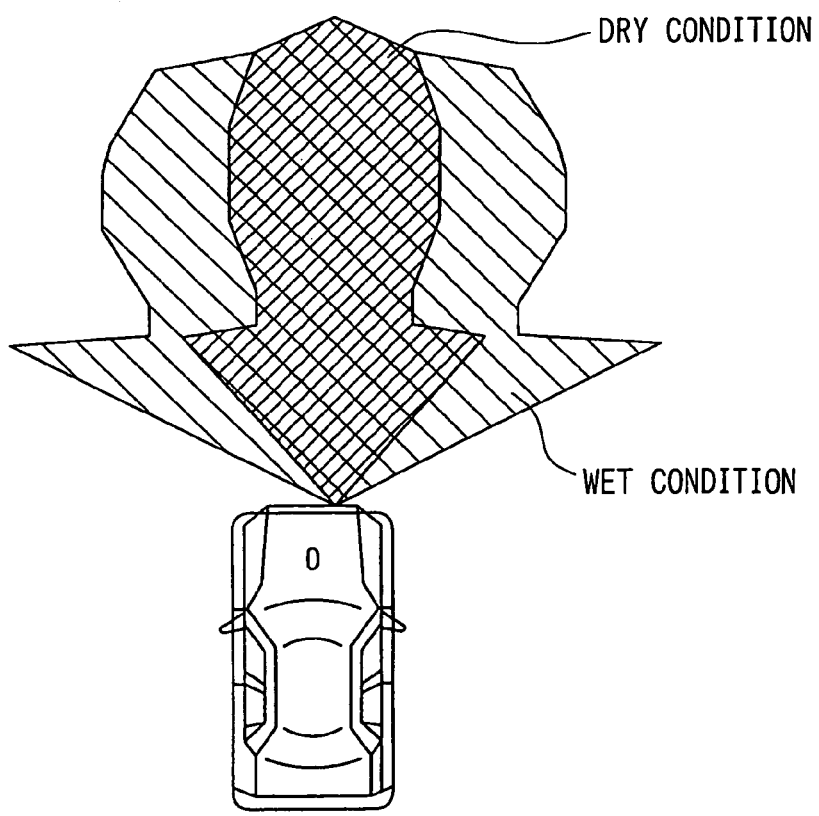
FIG. 6 is a schematic view of an object detecting range provided by the conventional apparatus.

As a result, as shown in FIG. 4, the object detecting ranges differ very little between the dry condition and the wet condition of the window radiating window 1c in comparison with the conventional case shown in FIG. 6. The apparatus thus rarely erroneously detect the forward object as a wider one and the distance to the object.

The present invention should not be limited to the disclosed embodiment, but may be implemented in many other ways without departing from the spirit of the invention.

What is claimed is:

1. An object detecting apparatus for detecting an object, the apparatus comprising:

a case having a light radiating window and a light receiving window, the windows being made of light transmitting material;

a light radiation unit disposed in the case for radiating a light toward an outside of the case through the light radiating window; and a light receiver unit disposed in the case for receiving the light reflected by the object through the light receiving window, wherein the light radiating window has a hydrophilic layer on an outer surface thereof exposed to an outside of the case.

2. The object detecting apparatus as in claim 1, wherein the hydrophilic layer is made of silicon dioxides.

3. The object detecting apparatus as claimed in claim 2, wherein the light radiating window has a glass substrate, a photo-catalyst layer interposed between the glass substrate and the hydrophilic layer.

4. The object detecting apparatus as claimed in claim 1, further comprising a reflecting mirror and a polygon mirror.

5. The object detecting apparatus as claimed in claim 4, wherein the polygon mirror is a frustum hexagonal prism.

6. The object detecting apparatus as claimed in claim 1, wherein the light receiver unit includes a fresnel lens and a light receiving element.

7. The object detecting apparatus as claimed in claim 1, wherein the photo-catalyst layer is made of titanium oxides.

8. The object detecting apparatus as claimed in claim 4, wherein the light receiver unit includes a fresnel lens and a light receiving element.

9. The object detecting apparatus as claimed in claim 4, wherein the photo-catalyst layer is made of titanium oxides.

10. An object detecting apparatus for detecting an object, the apparatus comprising:
    a case, including at least one window with a hydrophilic layer disposed on an outer surface thereof, exposed to an outside of the case;
    a light radiating unit to radiate light to the object through the at least one window; and
    a light receiving light to receive light reflected from the object through the at least one window.

11. The object detecting apparatus as in claim 10 wherein the hydrophilic layer is made of silicon dioxides.

12. The object detecting apparatus as in claim 10, wherein the at least one window includes at least one light radiating window and at least one light receiving window.

13. The object detecting apparatus as in claim 12, wherein the at least one light radiating window includes a hydrophilic layer.

14. The object detecting apparatus as claimed in claim 12, wherein the at least one light radiating window has a glass substrate, a photo-catalyst layer interposed between the glass substrate and the hydrophilic layer.

15. An object detecting apparatus for detecting an object, the apparatus comprising:
    a case, including at least one window, the at least one window including a hydrophilic layer on an outer surface thereof, exposed to an outside of the case;
    means for radiating light to the object through the at least one window; and
    means for receiving light reflected from the object through the at least one window.

16. The object detecting apparatus as in claim 15, wherein the hydrophilic layer is made of silicon dioxides.

17. The object detecting apparatus as in claim 15, wherein the at least one window includes at least one light radiating window and at least one light receiving window.

18. The object detecting apparatus as in claim 17, wherein the at least one light radiating window includes a hydrophilic layer.

19. The object detecting apparatus as claimed in claim 17, wherein the at least one light radiating window has a glass substrate, a photo-catalyst layer interposed between the glass substrate and the hydrophilic layer.

20. The object detecting apparatus as claimed in claim 18, wherein the at least one light radiating window has a glass substrate, a photo-catalyst layer interposed between the glass substrate and the hydrophilic layer.

* * * * *